United States Patent [19]

Tanaka et al.

[11] Patent Number: 4,579,704
[45] Date of Patent: Apr. 1, 1986

[54] PROCESS FOR SINTERING CUBIC SYSTEM SILICON CARBIDE POWDER

[75] Inventors: Hidehiko Tanaka; Yoshizo Inomata, both of Sakura; Hitoshi Tsukuda, Ube, all of Japan

[73] Assignee: National Institute for Research in Inorganic Materials, Ibaraki, Japan

[21] Appl. No.: 583,236

[22] Filed: Feb. 24, 1984

[30] Foreign Application Priority Data

Apr. 14, 1983 [JP] Japan .................................. 58-66176
Sep. 21, 1983 [JP] Japan ................................ 58-174680

[51] Int. Cl.$^4$ ............................................ C04B 35/56
[52] U.S. Cl. ......................................... 264/65; 264/63; 264/66; 501/88; 501/90
[58] Field of Search ............... 264/65, 66, 63; 501/88, 501/92, 90

[56] References Cited

U.S. PATENT DOCUMENTS

| 4,041,117 | 8/1977 | Prochazka | 264/65 |
| 4,124,667 | 9/1978 | Coppola | 264/65 |
| 4,135,937 | 1/1979 | Murata | 264/65 |
| 4,237,085 | 12/1980 | Smoak | 264/65 |
| 4,318,876 | 3/1982 | Broussand | 264/65 |
| 4,336,216 | 6/1982 | Watanabe | 264/65 |
| 4,372,902 | 2/1983 | Denton | 264/65 |
| 4,374,793 | 2/1983 | Koga | 264/65 |

FOREIGN PATENT DOCUMENTS

| 46996 | 2/1980 | Japan . |
| 32035 | 7/1982 | Japan . |
| 17146 | 1/1983 | Japan . |

OTHER PUBLICATIONS

"The Role of Boron and Carbon in the Sintering of Silicon Carbide", *Special Ceramics 6*, British Ceramic Research Association (1975) by S. Prochazka.

*Primary Examiner*—James Derrington
*Attorney, Agent, or Firm*—Oblon, Fisher, Spivak, McClelland & Maier

[57] ABSTRACT

A process for sintering cubic system silicon carbide powder, which comprises compacting a mixture of cubic system silicon carbide powder with more than 1% by weight and not more than 3% by weight of carbon and at least 0.10% by weight and less than 0.3% by weight of boron and sintering the compact thereby obtained, under vacuum or in a chemically inert atmosphere at a temperature of from 1,900° to 2,200° C.

6 Claims, 7 Drawing Figures

5 µm

5 µm

200 μm

10 μm

PROCESS FOR SINTERING CUBIC SYSTEM SILICON CARBIDE POWDER

BACKGROUND OF THE INVENTION

1. Field of the Invention

The present invention relates to a process for sintering a powder of cubic system silicon carbide (hereinafter referred to as "$\beta$-SiC").

2. Description of the Prior Art

Sintered products of silicon carbide are widely used as abrasion resistant and heat resistant materials by virtue of their superior hardness and high-temperature strength. The silicon carbide is available in two crystal forms, i.e. $\alpha$- and $\beta$-forms. The present invention is concerned with the process for sintering $\beta$-SiC powder.

As a process for sintering $\beta$-SiC powder, it has been known to mix the powder with predetermined amounts of boron and carbon, and sinter the mixture in a $N_2$ gas atmosphere or in an inert gas atmosphere.

In the sintering of $\beta$-SiC powder, the difficulty in obtaining a high density product is attributable to the fact that grain growth takes place at the final stage of the sintering and coarse grains having a grain size of e.g. 100 $\mu$m or more will thereby be formed in a substantial amount, whereby a high density is hardly attainable. Boron is effective for an increase of the density of the sintered body, but at the same time, it has a function to facilitate the grain growth at the final stage of the sintering. Carbon serves effectively for the removal of $SiO_2$ (which hinders the sintering) contained as an impurity in the $\beta$-SiC powder, but it has been believed that carbon is detrimental if used in excess of the amount required for the deoxidation.

Thus, the amounts of boron and carbon to be mixed with the $\beta$-SiC powder used to be restricted to certain specific ranges. For instance, it has been proposed to use from 0.5 to 5.0% by weight of boron and from 1.5 to 5.0% by weight of carbon (Japanese Examined Patent Publication No. 17146/1983), or from 0.3 to 3% by weight of boron and from 0.1 to 1.0% by weight of carbon (Japanese Examined Patent Publication No. 32035/1982). Namely, it has been generally believed that it is necessary to incorporate boron in an amount of at least 0.3% by weight and not to incorporate carbon excessively.

However, these conventional processes still had a difficulty that it was thereby impossible to adequately control the abnormal grain growth and to obtain a sintered body having an adequately high density.

Further, Japanese Examined Patent Publication No. 46996/1980 proposes a process comprising mixing from 0.1 to 5% by weight of each of carbon and boron to a $\beta$-SiC powder prepared by a certain specific method and sintering the mixture. According to this process, it is allegedly possible to use boron in an amount as small as 0.1% by weight. However, in all the Examples given in this publication, boron is used in an amount greater than 1.0% by weight, and the use of boron in a smaller amount is not substantiated. Besides, this process has a serious drawback that the $\beta$-SiC powder must be prepared by a complicated method.

SUMMARY OF THE INVENTION

It is an object of the present invention to overcome the above-mentioned difficulties inherent to the conventional processes and to provide a process for sintering $\beta$-SiC powder, whereby a high density sintered product is readily obtainable without leading to substantial grain growth.

As a result of extensive researches, the present inventors have found that the grain-boundary energy of $\beta$-SiC particles can be lowered by interposing amorphous carbon (or other amorphous inorganic substances such as glass) at the grain boundary and that the sintering of the $\beta$-SiC powder will be facilitated and the grain growth will be prevented or suppressed by the presence of the carbon at the grain boundary, whereby a high density sintered product is obtainable by using a relatively small amount of boron. On the basis of this discovery, the present invention provides a process for sintering cubic system silicon carbide powder, which comprises compacting a mixture of cubic system silicon carbide powder with more than 1% by weight and not more than 3% by weight of carbon and at least 0.10% by weight and less than 0.3% by weight of boron and sintering the compact thereby obtained, under vacuum or in a chemically inert atmosphere at a temperature of from 1,900° to 2,200° C.

It has also been found that this process can be further improved by subjecting the compact to pretreatment which comprises heating the compact at a temperature of from 1,100° to 1,500° C. under reduced pressure of from $10^{-1}$ to $10^{-3}$ atm, and removing CO gas thereby generated, prior to the sintering. Namely, when no such pretreatment of the compact is conducted, the amount of boron to be incorporated into the $\beta$-SiC powder is preferably at least 0.15% to obtain a high density product. Whereas, when the pretreatment is conducted, the amount of boron may be reduced to a level of 0.10% by weight.

Now, the present invention will be described in detail with reference to the preferred embodiments.

BRIEF DESCRIPTION OF THE DRAWINGS

In the accompanying drawings.

DETAILED DESCRIPTION OF THE INVENTION

Figure 1:
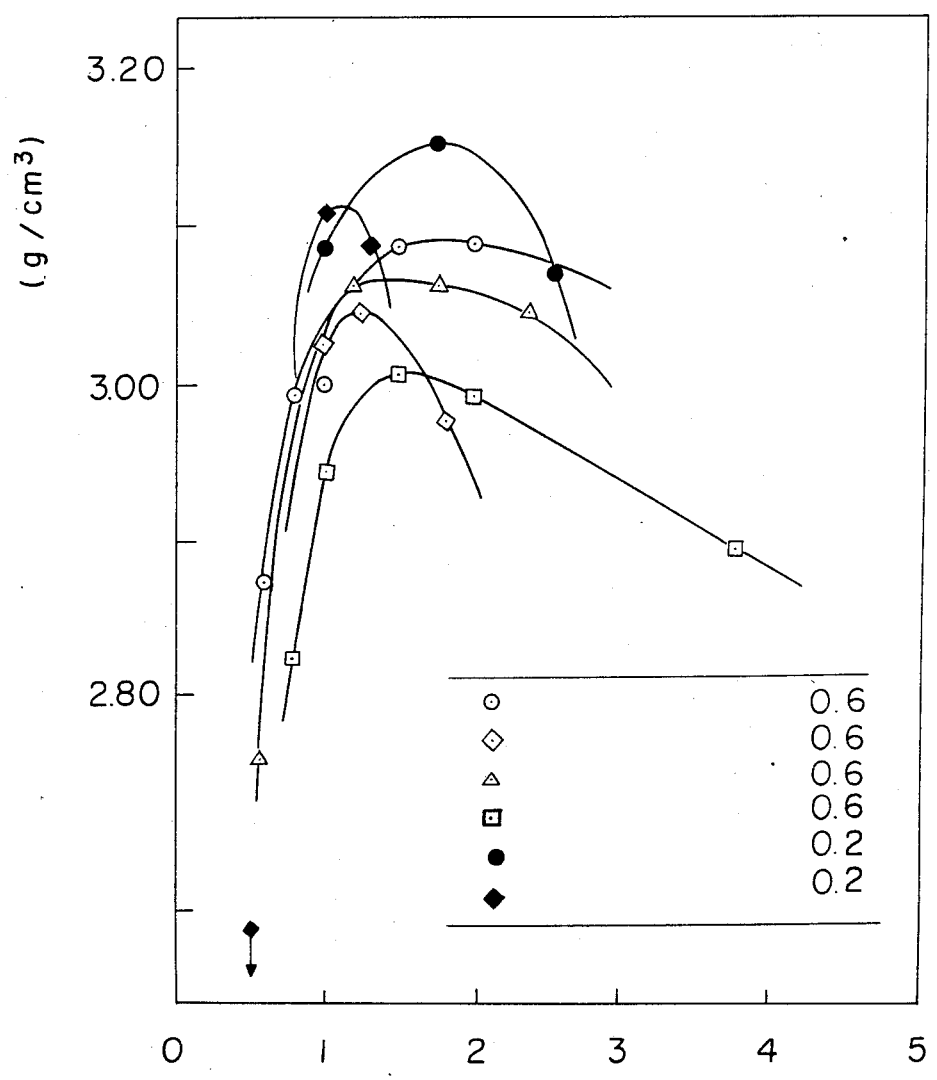
FIG. 1 is a graph illustrating the relation between the carbon contents and the densities of $\beta$-SiC sintered products prepared from mixtures containing various carbon sources.

As shown in FIG. 1, the amount of carbon to be incorporated into the $\beta$-SiC powder is desirably within a range of more than 1% by weight and not more than 3% by weight, although it may vary more or less depending upon the particular carbon source used. If the amount of carbon is not more than 1% by weight, the thickness of the grain-boundary phase interposed at the grain boundary will be inadequate, whereby it will be difficult to obtain a high density sintered product. On the other hand, if the amount exceeds 3% by weight, the excess amount adversely affects the improvement of the density.

In the present invention, the carbon is incorporated into the β-SiC powder preferably by a method which comprises uniformly applying a solution of a carbon source polymer such as pitch tar, a furan resin, a phenol resin, a polyimide resin or a polyacrylonitrile resin in a solvent such as acetone, benzene or an alcohol, to the surface of the β-SiC powder, drying the powder and gradually heating the dried powder to a temperature of 400° to 550° C. at a rate of e.g. 30° C./hr in a chemically inert atmosphere to form carbon on the surface of the powder.

Figure 3:
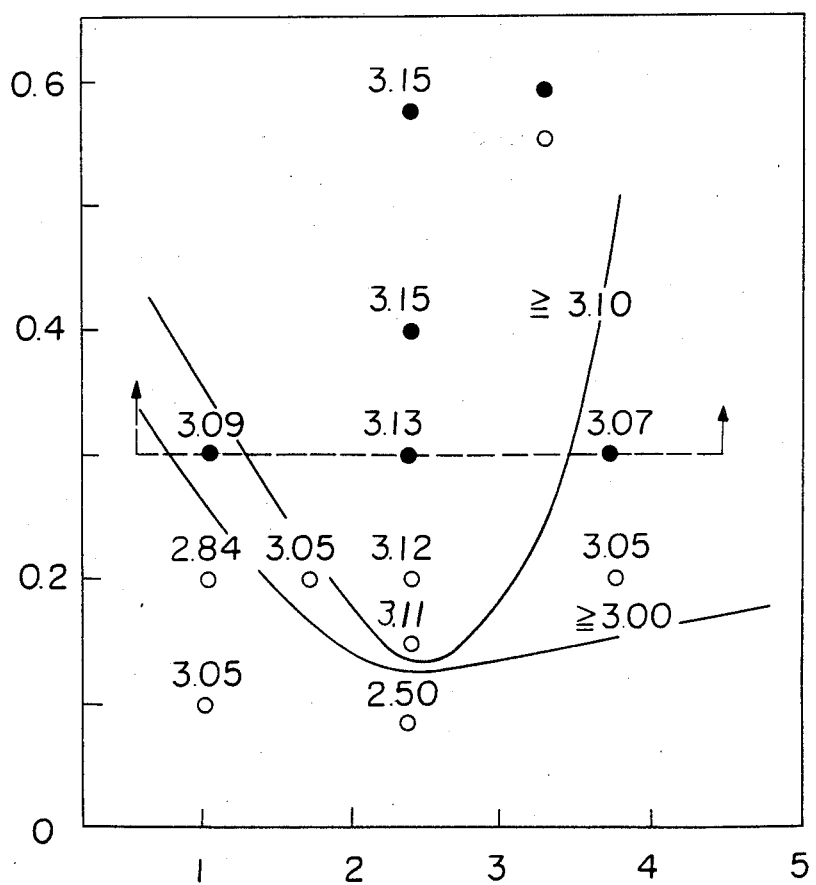
FIG. 3 is a graph illustrating the boron contents and the grain growth at the final stage of the sintering.

FIG. 3 illustrates the relation between the boron content and the density and grain growth (the sintering temperature: 2,050° C.) wherein the black circle indicates the grain growth, the white circle indicates no grain growth and the numerical values indicate the densities. As shown in the Figure, the optimum amount of boron to be incorporated into the β-SiC powder is within a range of at least 0.10% by weight and less than 0.3% by weight. Namely, if the amount of boron is 0.3% by weight or greater, the grain growth takes place, and if the amount is less than 0.10% by weight, the density of the sintered product tends to be inadequate.

The boron is incorporated in the form of metallic boron, boron carbide or a boron compound which is convertible to boron when heated.

The mixture of β-SiC powder with carbon and boron, is then compacted, and the compact thereby obtained is sintered under vacuum or in a chemically inert atmosphere such as an argon atmosphere, at a temperature of from 1,900° to 2,200° C. If the temperature is lower than 1,900° C., no adequate sintering can be accomplished, whereby it is difficult to obtain a sintered product having an adequately high density. On the other hand, a temperature higher than 2,200° C. is not required for the sintering, and such a high temperature is uneconomical.

According to another aspect of the present invention, the sintering process can further be improved by subjecting the compact to pretreatment prior to the sintering. The pretreatment comprises heating the compact at a temperature of from 1,100° to 1,500° C. under reduced pressure of from $10^{-1}$ to $10^{-3}$ atm, and removing CO gas thereby generated. This is based on the following reaction system and discovery.

Namely, $SiO_2$ contained in the β-SiC powder reacts with the added carbon at a temperature of at least 1,000° C. to generate CO gas, in accordance with the following reaction (1) or (2):

$$SiO_2 + C = SiO + CO \quad (1)$$

$$SiO_2 + 3C = SiC + 2CO \quad (2)$$

Then, the CO gas will react with the added boron to form $B_2O_3$ gas, in accordance with the following reaction:

$$3CO + 2B = B_2O_3 + 3C \quad (3)$$

Thus, the added boron is consumed by the reaction (3). Therefore, if $SiO_2$ is removed prior to the sintering so that the consumption of boron by the reaction (3) as avoided the amount of boron required can be reduced accordingly. For this purpose, the compact is treated under reduced pressure of from $10^{-1}$ to $10^{-3}$ atm at a temperature of from 1,100° to 1,500° C. prior to the sintering. Namely, the reactions (1) and (2) take place at 1,100° to 1,500° C. under $10^{-1}$ to $10^{-3}$ atm, and the generated CO gas is discharged from the system without being reacted with boron, whereby the reaction (3) is avoided and no consumption of boron takes place.

Figure 2:
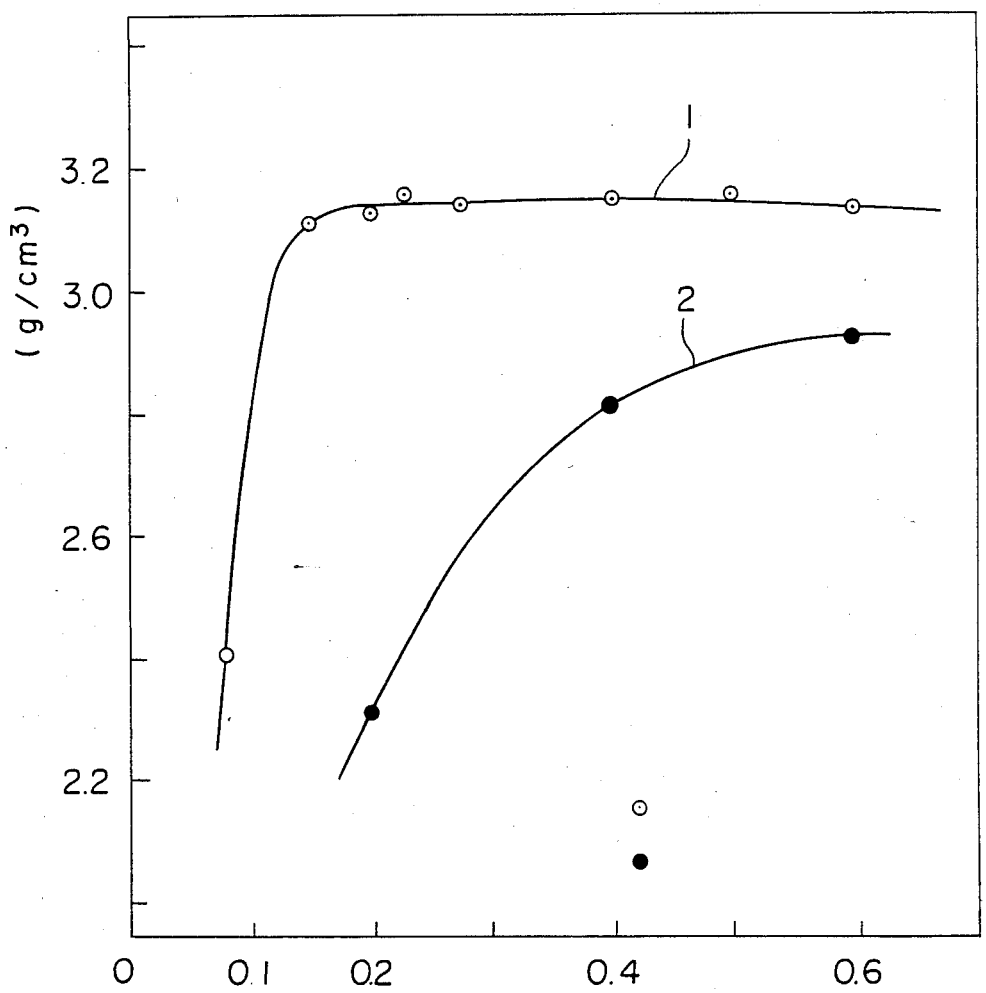
FIG. 2 is a graph illustrating the relation between the boron contents and the densities of the sintered products.

When no such pretreatment of the compact is conducted, it is preferred to incorporate boron in an amount of at least 0.15% by weight relative to the β-SiC powder to obtain a sintered product having an adequately high density. This minimum amount of boron can be further reduced to a level of 0.10% by weight by conducting the pretreatment. FIG. 2 shows that when the pretreatment is conducted (i.e. the curve 2), the amount of boron may be from 0.10 to 0.3% by weight and a density as high as 3.18 g/cm³ is thereby obtainable, whereas when no such pretreatment is conducted (i.e. the curve 1), the minimum amount of boron required, is substantially higher because boron is consumed by the above-mentioned reaction (3) and yet the density is lower than that obtainable with the pretreatment.

It has been known that it is desirable to remove $SiO_2$ from the β-SiC powder prior to the sintering (Japanese Unexamined Patent Publication Nos. 166369/1982 and 166372/1982). However, in each of these prior art processes, the powder is treated in a reducing gas ($H_2$ or CO) atmosphere under reduced pressure to activate the powder surface, whereby $SiO_2$ is removed by the following reactions:

$$SiO_2 + H_2 = SiO + H_2O$$

$$SiO_2 + CO = SiO + CO_2$$

It is also disclosed that in a case where no reducing gas is employed, it is advisable to use a high vacuum condition of from $10^{-4}$ to $10^{-7}$ atm, whereby the following reaction is conducted.

$$SiO_2 = SiO + \tfrac{1}{2}O_2$$

These processes where the reducing gas is employed, are not only dangerous but also cumbersome in their operation. On the other hand, in the case where a high vacuum condition is employed, an expensive sophisticated exhaust gas discharge system is required to maintain the vacuum condition at a level of from $10^{-4}$ to $10^{-7}$ atm in an ordinary sintering furnace.

Whereas, according to the present invention, the compact is heated at a temperature of from 1,100° to 1,500° C. under a relatively low vacuum condition at a level of from $10^{-1}$ to $10^{-3}$ atm whereby the CO gas generated may readily be removed. Thus, the process of the present invention does not require the use of any reducing gas, and the CO gas can be removed by a simple exhaust gas discharge system. The generated CO gas immediately be discharged at a temperature of not higher than 1,500° C. under reduced pressure, whereby it will not be consumed by the reaction with boron.

If the temperature is lower than 1,100° C., $SiO_2$ is hardly decomposed. On the other hand, if the temperature is higher than 1,500° C., SiC tends to decompose and the sintering will thereby be adversely affected. Thus, the temperature should be from 1,100° to 1,500° C. If the pressure is higher than $10^{-1}$ atm, the decomposition to CO gas and the discharge thereof tend to be slow. On the other hand, it is unnecessary to reduce the pressure beyond $10^{-3}$ atm and such an excessively high vacuum condition is uneconomical.

Now, the present invention will be described in further detail with reference to Example and Comparative Examples.

EXAMPLE 1

$\beta$-SiC powder identified in Table 1 was used. The $\beta$-SiC powder was prepared by reacting $SiO_2$ with carbon.

TABLE 1

| $\beta$-SiC powder used as starting material | |
|---|---|
| True specific gravity | 3.19 to 3.22 g/cm$^3$ |
| Crystal form | Cubic system crystal (3C) |
| Average particle size | 0.25 to 0.28 $\mu$m |
| Particles having a size of not larger than 1 $\mu$m | 95 to 98% |
| Specific surface area | 15.1 to 18.7 m$^2$/g |
| Impurities | Al 0.03 to 0.06% |
|  | Fe 0.03 to 0.07% |
|  | SiO$_2$ 0.22 to 0.33% |
|  | C 0.34 to 0.47% |

As the carbon source, a phenol resin was used. The phenol resin was dissolved in acetone. The solution thereby obtained, was applied to the $\beta$-SiC powder in such an amount that the remaining carbon constitutes 2% by weight. Then, the powder was adequately dried in a vacuum drier at about 100° C. for 24 hours, and gradually heated to a temperature of from 400° to 550° C. in a furnace of an argon gas atmosphere at a temperature raising rate of 3° C./min, whereby carbon was uniformly formed on the surface of the $\beta$-SiC powder. Then, 0.2% by weight of boron was added thereto. The mixture was thoroughly mixed and compacted by a rubber press to form a compact having a density of about 60% based on the theoretical density.

The compact was heated to 1,400° C. and vacuumed to a level of $10^{-3}$ atm, whereby the generated CO gas was discharged.

The compact thereby obtained, was sintered in an argon gas atmosphere of 1 atm at about 2,100° C. for 15 minutes.

The sintered product was composed of grains having a size of about 3 to about 10 $\mu$m, and no abnormal grain growth was observed. The density was as high as 3.15 g/cm$^3$ (i.e. 98% of the theoretical density). Thus, the product was a sintered body having a high density and no abnormal grain growth.

Figure 4A:
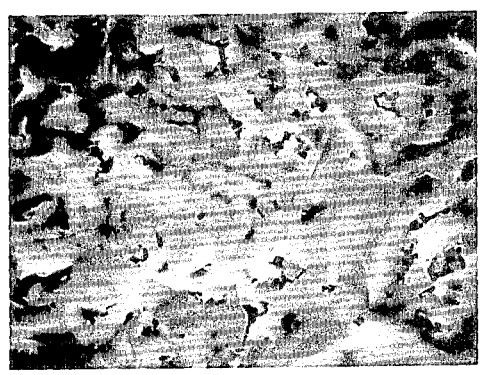
FIG. 4a is a scanning electron microscopic photograph of a fractured surface of the sintered product obtained in Example 1.
Figure 4B:
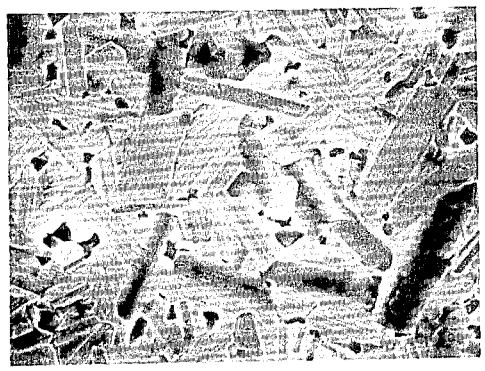
FIG. 4b is a scanning electron microscopic photograph of an etched surface of the same sintered product.

The characteristics of the sintered product are given in Table 2, and the SEM photographs of the its structure are shown in FIGS. 4a and 4b. FIG. 4a shows the fractured surface and FIG. 4b shows an etched surface of the sintered product.

TABLE 2

| Characteristics of $\beta$-SiC sintered product | |
|---|---|
| Amount of added carbon | 2% by weight |
| Amount of added boron | 0.2% by weight |
| Density | 3.15 g/cm$^3$ |
| Grain size | 3 to 10 $\mu$m |
| Strength | At room temperature: 600 MPa |
|  | At 1,500° C.: 650 MPa |

COMPARATIVE EXAMPLE 1

Figure 5A:
FIGS. 5a and 5b are scanning electron microscopic photographs of the sintered products of Comparative Samples A and B, respectively.
Figure 5B:
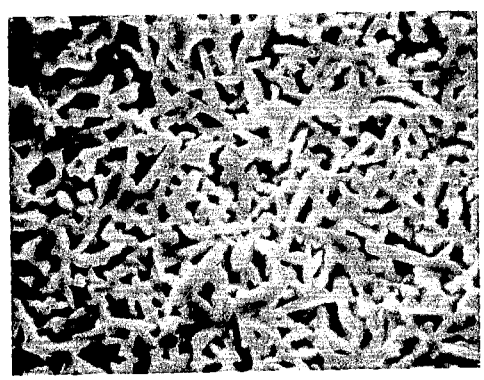

Comparative Samples A and B were prepared in the same manner as in Example 1. In Sample A, boron was added in an amount of 0.4% by weight, i.e. an excess amount. Whereas in Sample B, carbon was added in an amount of 0.25% by weight, i.e. less than ¼ of the optimum amount according to the present invention. The characteristics of the sintered products and the SEM photographs of their structures are shown in Table 3 and FIGS. 5a and 5b, respectively.

TABLE 3

| | Comparative Examples | |
|---|---|---|
| | Sample A | Sample B |
| Amount of added carbon* | 1.7% | 0.5% |
| Amount of added boron | 0.4% | 0.25% |
| Density | 3.16 g/cm$^3$ | 2.34 g/cm$^3$ |
| Structure | Abnormal grain growth | Insufficient density |

*The carbon source of Sample A was pitch tar.

In the case of Sample A, boron was added in an excess amount, and accordingly, abnormal grain growth took place to a great extent (see FIG. 5a) although an adequate density was obtained. Thus, Sample A is not qualified as a high performance material. On the other hand, in the case of Sample B, the amount of added carbon was insufficient, and no adequate density was obtained and the product was a porous and brittle material.

Further, it should be apparent from FIGS. 1 and 3 that no adequate density is obtainable when the amount of added boron is insufficient (less than 0.10%) or when the amount of added carbon is excessive (3% or more).

From the comparison of the Example with the Comparative Examples, it is evident that according to the present invention, a high density is attainable with a small amount of boron and a sintered product having a higher density and less grain growth than the conventional products, is obtainable by adding an adequate amount of carbon to form a secondary grain-boundary phase (i.e. from 1 to 3% by weight).

What is claimed is:

1. A process for sintering a cubic system silicon carbide powder, which comprises:
   (i) compacting a mixture of cubic system silicon powder with more than 1% by weight and not more than 3% by weight of carbon, and at least 0.10% by weight and less than 0.3% by weight of boron;
   (ii) subjecting the said compact to pretreatment which comprises heating the compact at a temperature of from 1100° C. to 1500° C. under a reduced pressure of from $10^{-1}$ to $10^{-3}$ atm, and removing CO gas thereby generated; and,
   (iii) sintering the said compact obtained, under vacuum or in a chemically inert atmosphere at a temperature of from 1900° C. to 2200° C.

2. The process according to claim 1, wherein the mixture contains at least 0.15% by weight and less than 0.3% by weight of boron.

3. The process according to claim 1, wherein the carbon is incorporated into the mixture by uniformly applying a solution of a carbon source polymer to the surface of the cubic system silicon carbide powder, drying the powder and gradually heating the dried powder to a temperature of 400° to 550° C. in a chemically inert atmosphere to form carbon on the surface of the powder.

4. The process according to claim 3, wherein the carbon source polymer solution is a solution of a carbon source polymer selected from a group consisting of pitch tar, a furan resin, a phenol resin, a polyimide resin and a polyacrylonitrile resin, in a solvent selected from a group consisting of acetone, benzene and an alcohol.

5. The process according to claim 1, wherein the boron is incorporated into the mixture in a form of metallic boron, boron carbide or a boron compound convertible to boron when heated.

6. The process according to claim 1, wherein the chemically inert atmosphere is an argon gas atmosphere.

* * * * *

UNITED STATES PATENT AND TRADEMARK OFFICE
CERTIFICATE OF CORRECTION

PATENT NO.   : 4,579,704
DATED        : April 1, 1986
INVENTOR(S)  : Hidehiko Tanaka, et al It is certified that error appears in the above-identified patent and that said Letters Patent is hereby corrected as shown below:

-- The Assignee has been spelled incorrectly on the Letters Patent, it should read as follows:

National Institute for Researches in Inorganic Materials not

National Institute for Research in Inorganic Materials. --

Signed and Sealed this

Fifteenth Day of July 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. :   4,579,704

DATED :   April 1, 1986

INVENTOR(S) :   Hidehiko Tanaka et al

It is certified that error appears in the above-identified patent and that said Letters Patent is hereby corrected as shown below:

Figures 1, 2 and 3 should appear as shown on the attached sheets

Signed and Sealed this

Twenty-eighth Day of April, 1987

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,579,704
DATED : APRIL 1, 1986
INVENTOR(S) : HIDEHIKO TANAKA ET AL

It is certified that error appears in the above-identified patent and that said Letters Patent is hereby corrected as shown below:

Please add legends to Figure 1 as illustrated below:

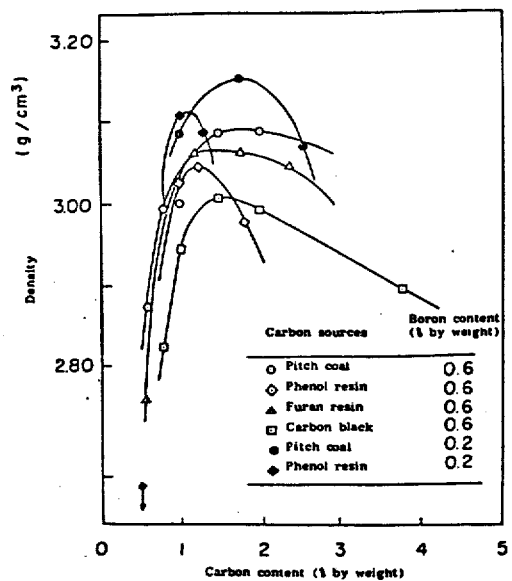

FIGURE 1

UNITED STATES PATENT AND TRADEMARK OFFICE
CERTIFICATE OF CORRECTION

PATENT NO. : 4,579,704
DATED : APRIL 1, 1986
INVENTOR(S) : HIDEHIKO TANAKA ET AL

It is certified that error appears in the above-identified patent and that said Letters Patent is hereby corrected as shown below:

Please add legends to Figure 2 as illustrated below:

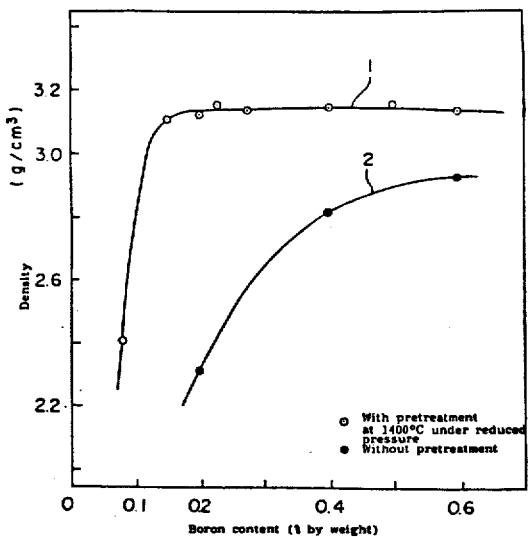

FIGURE 2

UNITED STATES PATENT AND TRADEMARK OFFICE
CERTIFICATE OF CORRECTION

PATENT NO. : 4,579,704                                   Page 4 of 4
DATED      : APRIL 1, 1986
INVENTOR(S): HIDEHIKO TANAKA ET AL It is certified that error appears in the above-identified patent and that said Letters Patent is hereby corrected as shown below:

Please add legends to Figure 3 as illustrated below:

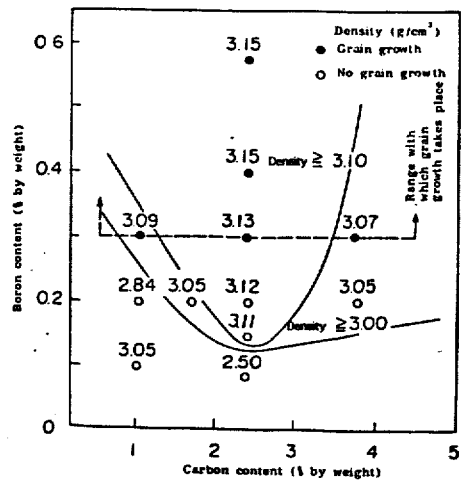

FIGURE 3